United States Patent [19]

Maeda

[11] Patent Number: 4,861,531
[45] Date of Patent: Aug. 29, 1989

[54] PROCESS FOR PRODUCTION OF EXPANSION-MOLDED ARTICLES IN A MOLD OF LINEAR LOW DENSITY POLYETHYLENE RESINS

[75] Inventor: Hirofumi Maeda, Takatsuki, Japan

[73] Assignee: Kanegafuchi Kagaku Kogyo Kabushiki Kaisha, Osaka, Japan

[21] Appl. No.: 155,907

[22] Filed: Feb. 16, 1988

[30] Foreign Application Priority Data

Feb. 20, 1987 [JP] Japan .................. 62-38844

[51] Int. Cl.$^4$ ............ C08J 9/22; C08J 9/14; C08J 9/18

[52] U.S. Cl. .................. 264/50; 264/53; 264/DIG. 9; 264/DIG. 13; 264/DIG. 15; 521/60

[58] Field of Search .......... 264/53, 51, DIG. 16, 264/50, DIG. 9, DIG. 15, DIG. 13; 521/60

[56] References Cited

U.S. PATENT DOCUMENTS

| | | | |
|---|---|---|---|
| 3,953,558 | 4/1926 | Hatano et al. | 264/50 XV |
| 4,631,159 | 12/1986 | Maeda et al. | 264/53 |
| 4,676,939 | 6/1987 | Kuwabara | 264/DIG. 16 |
| 4,695,593 | 9/1987 | Kuwabara et al. | 264/DIG. 16 |
| 4,704,239 | 11/1987 | Yoshimura et al. | 264/50 |

FOREIGN PATENT DOCUMENTS 53-33996 9/1978 Japan .

*Primary Examiner*—Philip Anderson

*Attorney, Agent, or Firm*—Armstrong, Nikaido, Marmelstein, Kubovcik & Murray

[57] ABSTRACT

The present invention provides a process for production of expansion-molded articles in a mold of a linear low density polyethylene resin which comprises compressing pre-expanded linear low density polyethylene resin beads having two melting points when measured by differential scanning calorimetry and, when the melting point at a low temperature side and the melting point at a high temperature side are designated $T_{ML}$ and $T_{MH}$ respectively, between said two melting points and the peak fusion area at said $T_{ML}$ is designated $A_L$ and the peak fusion area at said $T_{MH}$ is designated $A_H$ satisfying:

$$5\% \leq A_H/A_L \leq 80\%$$

under a gaseous pressure, filling with said compressed beads a mold capable of closing but incapable of sealing, then venting from said mold and, heating and fusing with steam in such a state that a compressive rate of said pre-expanded beads immediately before said heating with steam to the original pre-expanded beads is maintained to 5 to 60% thereby to produce the molded article in the shape of said mold. According to the present invention, the molded articles of linear low density polyethylene having a minimized dimensional shrinkage rate (good dimensional accuracy) and excellent fusion rate and surface appearance can be produced in high productivity.

5 Claims, 1 Drawing Sheet

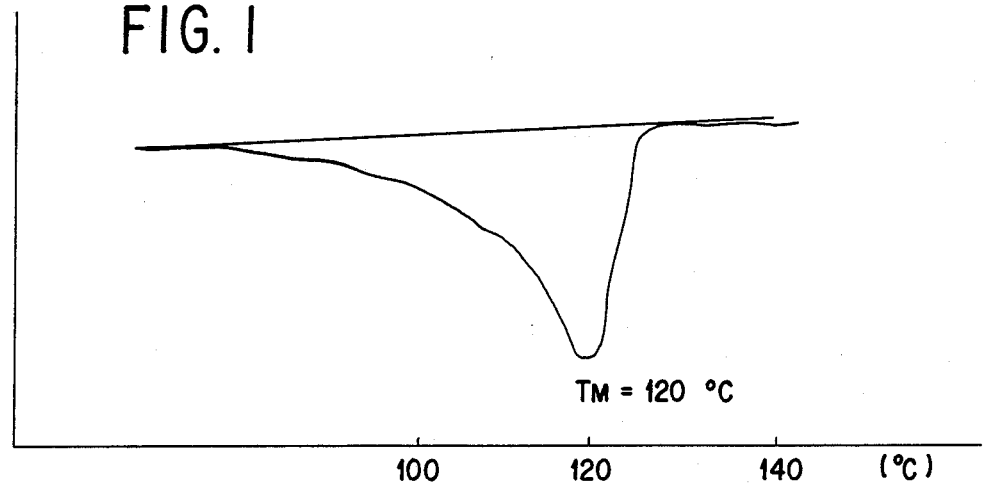
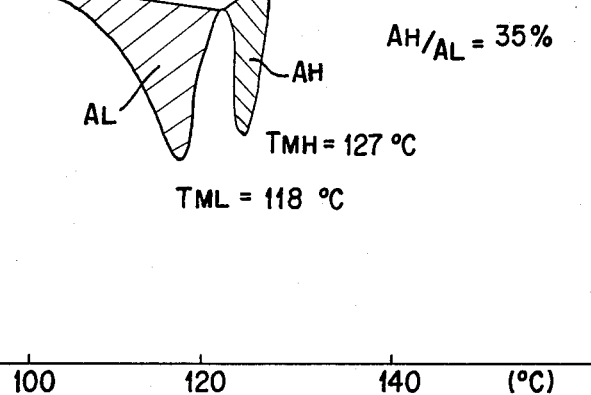

PROCESS FOR PRODUCTION OF EXPANSION-MOLDED ARTICLES IN A MOLD OF LINEAR LOW DENSITY POLYETHYLENE RESINS

BACKGROUND OF THE INVENTION

1. Field of the Invention

The present invention relates to a process for production of expansion-molded articles in a mold of linear low density polyethylene resins (hereafter referred to as L-LDPE) which are employed as thermal insulators, shock absorbing packaging materials, reusable containers, core materials for bumpers, etc.

2. Description of the Prior Art

Expansion-molded articles in a mold of L-LDPE are excellent in resistance to chemicals, resistance to heat, strain recovery after compression, etc. as compared to expansion-molded articles in a mold of polystyrene. Further the expansion-molded articles of L-LDPE are also excellent in resistant to heat, compressive strength, tensile strength, etc. even when compared with expansion-molded articles of low density polyethylene so that they have been used as shock absorbing packaging materials, reusable containers, core materials for bumpers, etc. To produce such expansion-molded articles of L-LDPE, etc., there are known the following methods;

(A) Method which comprises treating pre-expanded beads of polyolefin with an inorganic gas under pressure to impregnate the beads with the inorganic gas, gradually releasing the pressure, filling with the beads a mold capable of closing but incapable of sealing while the inner pressure of the beads is kept at 1.18 atms. or more and thermally fusing with steam, etc. to prepare a molded article in the shape of the mold (U.S. Pat. No. 3,953,558).

(B) Method which comprises filling with pre-expanded beads of polyolefin a mold capable of closing but incapable of sealing, thermally fusing with steam or the like, withdrawing the molded article from the mold and, thermally aging while the volume of the molded article is 70 to 110% of the volume of the mold to prepare the molded article in the shape of the mold (U.S. Pat. No. 4,631,159).

(C) Method which comprises compressing pre-expanded beads of cross-linked polyolefin to 80% or less of an apparent bulk volume of the raw beads by gaseous pressure, filling with the compressed beads a molding mold and thermally fusing to give a molded article in the shape of the mold (Published Examined Japanese Patent Application No. 33996/1978).

However, Method (A) described above involves a defect that initial investment becomes large because installation for the compressive treatment with inorganic gas is of a large scale and Method (B) has also a defect that products having a complicated shape are inferior in visual appearance such as sink mark, surface property, etc. Further Method (C) is not sufficiently satisfactory in surface property and dimensional accuracy.

SUMMARY OF THE INVENTION

An object of the present invention is to provide a process for production of expansion-molded articles in a mold of L-LDPE having good dimensional accuracy and having excellent fusion rate and surface property with high productivity.

Other objects and advantages of the present invention will be apparent from the following detailed description.

As a result of extensive investigations in view of such actual situations, the present inventors have found that when a melting point at a low temperature side and melting point at a high temperature side are $T_{ML}$ and $T_{MH}$ respectively, between two melting points of pre-expanded L-LDPE beads measured by the differential scanning calorimetry (hereafter referred to as DSC method) and the peak fusion area at $T_{ML}$ described above is designated $A_L$ and the peak fusion area at $T_{MH}$ is designated $A_H$ the problems described above could be overcome by controlling to a specific range which satisfies:

$$5\% \leqq A_H/A_L \leqq 80\%$$

and controlling the compressive rate of the pre-expanded beads to a specific range and, have accomplished the present invention.

BRIEF DESCRIPTION OF THE DRAWINGS

FIG. 1 is an explanatory drawing regarding how to determine the melting point ($T_M$) of L-LDPE of the present invention obtained in Example 2 measured by the DSC method. FIG. 2 is an explanatory drawing regarding how to determine the melting point ($T_{ML}$) at the low temperature side and the melting point ($T_{MH}$) at the high temperature side, of the L-LDPE pre-expanded beads as well as $A_L/A_H$ from the respective peak areas ($A_L$, $A_H$).

DETAILED DESCRIPTION OF THE INVENTION

The present invention is directed to a process for production of expansion-molded articles in a mold (hereinafter referred to as "molded articles") of L-LDPE which comprises compressing pre-expanded L-LDPE beads having two melting points when measured by differential scanning calorimetry and, when the melting point at the low temperature side, the melting point at the high temperature side are designated $T_{ML}$ and $T_{MH}$ respectively, between the two melting points and the peak fusion area at $T_{ML}$ described above is designated $A_L$ and the peak fusion area at $T_{MH}$ is designated $A_H$ having $A_L/A_H$ of 5 to 80% under a gaseous pressure, filling with the compressed beads a mold capable of closing but incapable of sealing, then venting from the mold and, heating and fusing with steam in such a state that a compressive rate of the pre-expanded beads immediately before the heating with steam to the original preexpanded beads is maintained to 5 to 60%, thereby to produce the molded article in the shape of the mold.

The DSC method in the present invention will be described below.

As devices for measurement, mention may be made of ordinary differential scanning calorimeters, for example, Model DSC-2 manufactured by Perkin-Elmer Co., Ltd., and Model TAS-100 manufactured by Rigaku Denki K.K., etc.

The melting point of L-LDPE described above is the peak temperature $T_M$ obtained when measured on an endothermic curve at a temperature elevation rate of 10° C./min. after elevating the temperature of a sample to 200° C. at a rate of 10° C./min. and then cooling to room temperature at a rate of 10° C./min. to crystalize, using a differential scanning calorimeter (DSC) (FIG. 1).

On the other hand, the melting points of the pre-expanded L-LDPE beads indicate the peak temperatures $T_M$ when an endothermic curve of the sample is measured at a temperature elevation rate of 10° C./min., wherein the peak temperature at the low temperature side (melting point at the low temperature side) and the peak temperature at the high temperature side (melting point at the high temperature side) are designated $T_{ML}$ and $T_{MH}$ respectively. The areas of these peak temperatures are designated $A_L$ and $A_H$ respectively (FIG. 2).

It is preferred that the L-LDPE used in the present invention be a copolymer of ethylene having a melting point of 115° to 130° C., a density of 0.915 to 0.940 g/cm$^3$, MI of 0.1 to 5 g/10 mins. with an α-olefin having 4 to 10 carbon atoms.

Examples of the α-olefin having 4 to 10 carbon atoms used as the comonomer include 1-butene, 1-pentene, 1-hexene, 3, 3-dimethyl-1-butene, 4-methyl-1-pentene, 4,4-dimethyl-1-pentene, 1-octene, etc. These comonomers may be used singly or in combination of two or more.

When the melting point of the copolymer described above is lower than 115° C., heat resistance of the expanded product obtained is insufficient and when it exceeds 130° C., the product approximates to high density polyethylene, resulting in difficulty in molding.

In the case that the density of the copolymer described above is less than 0.915 g/cm$^2$, rigidity of the resin is insufficient so that the molded article having a high expansion degree can be obtained only with difficulty; when the density is larger than 0.940 g/cm$^2$, impact resistance becomes poor and, the product is fragile and approximates high density polyethylene, which renders molding difficult.

When MI of the copolymer described above is less than 0.1, fluidity is poor upon expansion, resulting in difficult expansion to a high degree and surface smoothness of the molded article becomes poor. On the other hand, when MI exceeds 5, fluidity becomes excessively large so that continuous cells tend to occur upon the expansion and a cell diameter tends to be non-uniform.

The melting point of the copolymer described above is the peak temperature obtained when measured on an endothermic curve at a temperature elevation rate of 10° C./min. after elevating the temperature of a sample to 200° C. at a rate of 10° C./min. and then cooling to room temperature at a rate of 10° C./min. to crystalize, using a DSC. The density is a value determined in accordance with JIS K 6760 (JIS K 7112, Method D) and MI is a value determined in accordance with JIS K 6760 (JIS K 7210, 190° C., under load of 2.16 kg). These L-LDPEs are preferably in a non-crosslinked state but they may also be crosslinked with peroxides or radiations, etc.

The L-LDPE which can be used in the present invention may be also added with appropriate addenda such as a thermal stabilizer, a UV absorbing agent, an antistatic agent, a flame retardant, a coloring agent, finely divided inorganic powders, etc. depending upon the purpose. Particularly in case that the L-LDPE is used as resin beads having a relatively small bead diameter as in the present invention which will be later explained, re-granulation with an extruder, etc. may be necessary sometimes and therefore, it is preferred that phenyl type and/or phosphorus type antioxidants be added in an amount ranging from 0.01 to 0.5 wt % based on the resin, in order to prevent thermal deterioration of L-LDPE. Examples of the phenol type antioxidant include octadecyl-3-(3,5-di-tertiary-butyl-4-hydroxyphenyl) propionate, pentaerythritol-tetrakis [3-(3,5-di-tertiary-butyl-4-hydroxyphenyl)propionate], etc. Examples of the phosphorus type antioxidant include tris (2,4-di-tertiary-butylphenyl) phosphite, poly (nonyl-phenyl) phosphite, triphenyl phosphite, etc.

It is preferred that the L-LDPE beads used in the present invention be those having a bead weight of 0.5 to 20 mg/bead. When the bead weight is less than 0.5 mg/bead, it tends to be difficult to provide highly expanded articles; with more than 20 mg/bead, the pre-expanded beads become too large so that the expansion-molding in a mold tends to be carried out only with difficulty.

To produce the pre-expanded L-LDPE beads of the present invention, there is not particular limitation to its process but the following pre-expansion method is advantageous to obtain the two fusion peaks in the DSC method.

Namely, there is a process which comprises dispersing L-LDPE beads and a volatile blowing agent in water in the presence of a dispersing agent in a pressure vessel, heating the dispersion to a determined expansion temperature in a range of −25° to +10° C. of the melting point of the resin beads to impregnate the resin beads with the blowing agent and then discharging the mixture of the beads and water into atmosphere showing a pressure lower than in the vessel under pressure higher than a steam pressure shown by the volatile blowing agent, while keeping the temperature and pressure in the vessel constant to produce the pre-expanded beads. In this case, the ratio $A_H/A_L$ of the peak area $A_H$ at the high temperature side to the peak area $A_L$ at the low temperature side varies depending upon molecular structure of L-LDPE, but $A_H/A_L$ can generally be controlled by controlling an expansion temperature upon the pre-expansion.

Examples of the volatile blowing agent which can be used in the present invention include aliphatic hydrocarbons or halogenated hydrocarbons having a boiling point of −50° to 120° C., for example, propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane, dichlorotetrafluoroethane, etc. These blowing agents may be impregnated with L-LDPE in an amount of 5 to 50 parts (parts by weight, hereafter the same) per 100 parts of L-LDPE, which is provided for the expansion.

In the process for pre-expansion of the beads which comprises dispersing the L-LDPE beads and the volatile blowing agent in water in the presence of the dispersing agent in a pressure vessel, making the system in the state at a high temperature under high pressure and then discharging into a low pressure region, the amount of the volatile blowing agent to be used is determined in such a manner that the content of the blowing agent in the resin is in the range described above, taking into account kind of the blowing agent, desired expansion magnification, rate of the resin in the vessel to the space in the vessel, etc.

The dispersing agent is used to prevent agglomeration of the resin beads with each other upon the heating and there can be used, for example, water-soluble high molecular weight substances such as polyvinyl alcohol, methyl cellulose, N-polyvinylpyrrolidone, etc.; sparingly water-soluble, finely divided inorganic materials such as calcium phosphate, magnesium pyrrophosphate, zinc carbonate, titanium oxide, aluminum oxide, etc. In the case of using the inorganic materials described above, it is preferred that a small quantity of a surface active agent such as a sodium alkylbenzenesulfonate, sodium α-olefinsulfonate, a sodium alkylsulfonate, etc. be employed in combination as a dispersing aid to reduce the amount of the inorganic material used, in order to improve fusion of the pre-expanded beads with each other upon the molding. In this case, approximately 0.1 to 3 parts of the sparingly water-soluble, finely divided inorganic material and approximately 0.001 to 0.5 parts of the anionic surface active agent are used based on 100 parts of the resin beads. Further in case that the water-soluble high molecular weight substance is used, approximately 0.1 to 5 parts are used based on 100 parts of the resin beads.

The amount of the L-LDPE beads to be dispersed in water is preferably 10 to 100 parts per 100 parts of water, in view of improved productivity and dispersion stability, reduced utility costs, etc.

In order to achieve the desired ratio of the peak area $A_H$ at the high temperature side to the peak area $A_L$ at the low temperature side, the heating temperature varies depending upon combination with kind of L-LDPE used, kind of the volatile blowing agent, desired expansion magnification, etc. but generally in a range of $-25°$ to $+10°$ C., preferably in a range of $-20°$ to $+5°$ C. With the melting point of, for example, 120° C., the heating temperature is chosen from a range of 95° to 125° C. When the heating temperature is lower than the range, reduction in the expansion magnification is remarkable and when the temperature is higher than the range, a rate of closed cells in the pre-expanded beads decreases, which are not preferred.

To impregnate the L-LDPE beads with the volatile blowing agent described above, there is applicable a conventional method which comprises bringing the dispersion in the pressure vessel into contact with the volatile blowing agent while stirring in the temperature range described above, etc. The inner pressure of the vessel in this case is a pressure higher than steam pressure which the volatile blowing agent shows.

By discharging the aqueous dispersion of the L-LDPE beads in the vessel into an atmosphere having a pressure lower than that in the vessel while keeping the temperature and pressure in the vessel constant, the pre-expanded L-LDPE beads suited for the expansion-molding in a mold can be obtained.

As the pre-expanded L-LDPE beads, those having the peak area ratio $A_H/A_L$ of 5 to 80% are used in the present invention; with less than 5%, an allowable temperature range for the molding becomes narrow and dimensional shrinkage (sink mark) of the molded article becomes large. Further when the ratio exceeds 80%, surface property of the molded article becomes worse and at the same time, internal fusibility becomes worse so that the heating temperature must be raised, resulting in a long molding cycle.

The thus obtained pre-expanded beads are charged in a pressure vessel and compressed by gaseous pressure. After the pre-expanded beads are charged in a mold which can be closed but cannot be sealed, an excess of the gas is released from the mold. In this case, a compressive rate of the pre-expanded beads is in a range of 5 to 60%. Then, the pre-expanded beads are heated and fused with steam to give a molded article in the shape of the mold. The molded article is withdrawn from the mold and, aged and heated in a conventional manner to give the molded article of L-LDPE.

The compressive rate of the pre-expanded beads described above is determined as follows.

The compressive rate is a value obtained by dividing a weight of the pre-expanded beads of L-LDPE filled in the mold described above under atmospheric pressure using a feeder as used in expanded styrol, etc. by a weight of the pre-expanded beads after discharging an excess of the gas in the mold subsequent to the compressive filling described above and is expressed by the question described below:

$$\text{Compressive rate (\%)} = \left(1 - \frac{\text{Weight of pre-expanded beads upon filling under atmospheric pressure}}{\text{Weight of pre-expanded beads upon compressive filling}}\right) \times 100$$

With less than 5% of the compressive rate described above, the surface property of the molded article becomes worse and sink mark or shrinkage tends to occur; on the other hand, when the compressive rate exceeds 60%, internal fusion becomes worse so that a molding cycle is prolonged and at the same time, pressure strength of a molding machine, a mold, etc., becomes greater, which is not economical.

Next, the present invention will be described in more detail be referring to the examples, comparative examples and reference examples but is not deemed to be limited to these examples.

Examples 1 to 10, Comparative Examples 1 to 6 and Reference Examples 1 and 2

TABLE 1

| Kind of L-LDPE | A | B |
|---|---|---|
| Comonomer | 1-Butene | 1-Octene |
| M.I.(g/10 mins.) | 1.1 | 2.0 |
| Density (g/cm$^2$) | 0.920 | 0.930 |
| Melting point by DSC method(°C.) | 120 | 126 |
| Weight of bead (mg/1 bead) | 4.5 | 4.5 |

In a pressure vessel were charged 100 parts of the two kinks of L-LDPE pellets A and B shown in Table 1 described above, 20 to 50 parts of dichlorodifluoromethane, 1.0 part of powdery basic calcium tertiary phosphate and 0.006 part of sodium n-paraffin sulfonate as dispersing agents together with 300 parts of water followed by heating to predetermined temperatures, respectively. The pressure in the vessel in this case was approximately 23 to 30 kg/cm$^2$-G. While maintaining the pressure in the vessel 23 to 31 kg/cm$^2$-G while supplying under pressure dichlorodifluoromethane, a valve located at the lower part of the pressure vessel was opened and the aqueous dispersion was discharged through an orifice plate having an opening diameter of 4 mm $\phi$ under atmospheric pressure to perform pre-expansion, whereby pre-expanded beads having an expansion magnification of 20 to 50 times were obtained.

The thus obtained pre-expanded beads each had the peak area ratio $A_H/A_L$ of the peak area $A_H$ based on the melting point at the high temperature side to the peak area $A_H$ based on the melting point at the low temperature side measured by the DSC method shown in Table 2. In the examples and the comparative examples, molded articles were obtained by charging the preexpanded beads in a pressure vessel, compressing the beads under air pressure, immediately filling in a block mold having a size of 290×270'50 mm in various compressive rates and heating under a steam pressure of apporximately 4.0 to 1.0 kg/cm²-G. After drying at 50° C. for 12 hours and then allowing to stand for 24 hours at room temperature, the molded articles were evaluated.

With respect to physical properties of the molded articles thus obtained, a fusion rate, dimensional shrinkage rate and surface appearance of each molded article were evaluated by the methods described below. The results are shown in Table 2. In Table 2, a steam pressure for the heating and a molding cycle upon the molding are also described.

In the reference examples, molded articles were obtained by charging the pre-expanded beads in a pressure vessel, compressing the beads by air of 70° C.×9 kg/cm²-G for 120 minutes to impart the internal pressure to the pre-expanded beads, withdrawing the beads under atmospheric pressure, filling in the mold described above and heating with a steam under approximately 1.0 and 1.1 kg/cm²-G. Physical properties, etc. are shown in Table 2.

For reference, internal pressures of the beads immediately before the filling into the mold are also given in the table.

Fusion rate:

After making a crack having a depth of approximately 5 mm on the surface of the molded article with a knife, the molded article is broken along with the crack, the rupture cross-section is observed and a rate of the number of the broken beads to the total number of the beads is determined.

⊚ fusion rate of 80% or more
○ fusion rate of 60 to less than 80%
Δ fusion rate of 50 to less than 60%
× fusion rate of less than 50%

A standard fusion rate satisfactory for the molded article is generally at least 60%. Dimensional shrinkage rate:

A size of the molded article is measured with a vernier caliper and a shrinkage rate is calculated based on the size of its mold.

⊚ shrinkage rate of 2% or less
○ shrinkage rate of 2 to less than 3%
Δ shrinkage rate of 3 to less than 5%
× shrinkage rate of 5% or more Surface appearance:

The molded articles are evaluated based on the following measures:

⊚ Unevenness is not observed on the surface and gaps between the beads are hardly observed.
○ Unevenness is somewhat observed on the surface but gaps between the beads are hardly observed.
Δ Unevenness is not observed on the surface but gaps between the beads are somewhat remarkable.
× Unevenness is observed on the surface and gaps between the beads are extremely large.

As is evident from the results shown in Table 2, the molded article of L-LDPE having a minimized dimensional shrinkage rate (good dimensional accuracy) and excellent fusion rate and surface appearance can be produced in high productivity, when the peak area ratio $A_H/A_L$ of the peak area $A_H$ at the high temperature side to the peak area $A_L$ at the low temperature side measured by the DSC method is in the range of 5 to 80% and the compressive rate of the pre-expanded beads to the mold for the expansion-molding is 5 to 60%. Further, as compared to conventional processes in which pre-expanded beads are treated under pressure to impart the internal pressure to the beads and then expansion-molding is performed, the process can save initial investment for installations and the molded article having a quality comparable to that of the conventional molded article can be obtained.

TABLE 2

| | Magnification of Pre-expanded beads(high magnification) | $A_H/A_L$ (%) | Compression Rate (%) | Maximum Heating Steam Pressure (kg/cm-G) | Molding Cycle (second) | Magnification of Molded Article (time) | Dimensional Compression Rate | Fusion ance | Surface Appear-Resin | |
|---|---|---|---|---|---|---|---|---|---|---|
| Example | | | | | | | | | | |
| 1 | 35 | 35 | 8 | 1.0 | 148 | 26 | ○ | ⊚ | ○ | A |
| 2 | 35 | 35 | 16 | 1.0 | 152 | 24 | ○ | ⊚ | ⊚ | A |
| 3 | 35 | 35 | 32 | 1.2 | 197 | 22 | ⊚ | ⊚ | ⊚ | A |
| 4 | 35 | 35 | 50 | 2.2 | 250 | 19 | ⊚ | ○ | ⊚ | A |
| 5 | 34 | 6 | 16 | 1.2 | 190 | 24 | ○ | ○ | ○ | A |
| 6 | 35 | 75 | 16 | 1.5 | 200 | 23 | ○ | ○ | ○ | A |
| 7 | 20 | 30 | 17 | 1.1 | 150 | 14 | ○ | ⊚ | ⊚ | B |
| 8 | 20 | 30 | 33 | 1.3 | 198 | 13 | ⊚ | ⊚ | ○ | B |
| 9 | 50 | 34 | 18 | 1.0 | 145 | 35 | ○ | ⊚ | ○ | B |
| 10 | 50 | 34 | 35 | 1.2 | 193 | 32 | ⊚ | ⊚ | ⊚ | B |
| Comparative Example | | | | | | | | | | |
| 1 | 35 | 35 | 0 | 1.0 | 146 | 27 | × | ⊚ | ○ | A |
| 2 | 35 | 35 | 65 | 4.0 | 300 | 17 | ○ | ○ | Δ | A |
| 3 | 34 | 4 | 16 | 1.0 | 146 | 24 | ○ | Δ | × | A |
| 4 | 35 | 85 | 16 | 1.0 | 146 | 24 | ○ | × | × | A |
| 5 | 35 | 85 | 16 | 2.0 | 250 | 22 | Δ | Δ | Δ | A |
| 6 | 34 | 4 | 16 | 2.0 | 250 | 22 | × | ○ | Δ | A |
| Reference Example | | | | | | | | | | |
| 1 | 35 | 35 | 1.4 (inner pressure of particle) | 1.0 | 185 | 30 | ⊚ | ⊚ | ⊚ | B |

TABLE 2-continued

| Magnification of Pre-expanded beads(high magnification) | $A_H/A_L$ (%) | Compression Rate (%) | Maximum Heating Steam Pressure (kg/cm-G) | Molding Cycle (second) | Magnification of Molded Article (time) | Dimensional Compression Rate | Fusion ance | Surface Appearance | Resin |
| --- | --- | --- | --- | --- | --- | --- | --- | --- | --- |
| 2 | 20 | 30 | 1.6 (inner pressure of particle) | 1.1 | 180 | 17 | ⊚ | ⊚ | ⊚ | B |

While the invention has been described in detail and with reference to specific embodiments thereof, it will be apparent to one skilled in the art that various changes and modifications can be made therein without departing from the spirit and scope thereof.

What is claimed is:

1. A process for production of an expansion-molded article of a linear low density polyethylene resin in a mold, which comprises compressing in a pressure vessel pre-expanded linear low density polyethylene resin beads having two melting points when measured by differential scanning calorimetry and, when the melting point at a low temperature side and the melting point at a high temperature side are designated $T_{ML}$ and $T_{MH}$ respectively, between said two melting points and the peak fusion area at said $T_{ML}$ is designated $A_L$ and the peak fusion area at said $T_{MH}$ is designated $A_H$ satisfying:

$$5\% < A_H/A_L < 80\%$$

under a gaseous pressure, filling a mold capable of closing but incapable of sealing with said compressed beads, then venting excess gas from said mold and, heating and fusing with steam in such a state that a compressive rate of said pre-expanded beads immediately before said heating with steam to the original pre-expanded beads is maintained to 5 to 60%, thereby producing a molded article in the shape of the mold.

2. A process as claimed in claim 1, wherein said linear low density polyethylene resin is a copolymer of ethylene having a melting point of 115° to 130° C., a density of 0.915 to 0.940 g/cm$^2$, MI of 0.1 to 5 g/10 mins. with an α-olefin having 4 to 10 carbon atoms.

3. A process as claimed in claim 2, wherein said α-olefin having 4 to 10 carbon atoms is at least one member selected from 1-butene, 1-pentene, 1-hexene, 3,3-dimethyl-1-butene, 4-methyl-1-pentene, 4,4-dimethyl-1-pentene and 1-octene.

4. A process as claimed in claim 1 or 2, wherein said linear low density polyethylene resin contains at least one member selected from a phenol type antioxidant and a phosphorus type antioxidant in an amount of 0.01 to 0.5 wt % based on said polyethylene resin.

5. A process as claimed in claim 1, wherein said linear low density polyethylene resin bead has a bead weight of 0.5 to 20 mg/bead.

* * * * *